(12) United States Patent
Gelbin

(10) Patent No.: US 6,569,927 B1
(45) Date of Patent: May 27, 2003

(54) THERMOPLASTIC RESINS STABILIZED BY BLENDS OF STERICALLY HINDERED PHENOLS, SECONDARY AMINES, AND LACTONES

(75) Inventor: Michael E. Gelbin, Middlebury, CT (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 0 days.

(21) Appl. No.: 09/685,168

(22) Filed: Oct. 6, 2000

(51) Int. Cl.[7] .............................. C08K 5/15; C08K 5/13; C08K 5/18
(52) U.S. Cl. .......................... 524/111; 524/87; 524/99; 524/107; 524/254; 524/255; 524/258; 524/284; 524/323; 524/349; 524/343; 524/350; 524/502; 524/508; 524/513; 524/537; 524/556
(58) Field of Search ............................ 524/87, 99, 107, 524/111, 254, 258, 255, 284, 323, 349, 350, 343, 502, 508, 513, 537, 556

(56) References Cited

U.S. PATENT DOCUMENTS

| 1,906,935 A | 9/1933 | Horst | |
|---|---|---|---|
| 1,975,167 A | 11/1934 | Meuser | 260/130 |
| 2,002,642 A | 5/1935 | Meuser et al. | 260/130 |
| 2,562,802 A | 7/1951 | Mankowich et al. | 260/576 |
| 3,452,056 A | 6/1969 | Sundholm | 260/390 |
| 3,505,225 A | 4/1970 | Wheeler | 252/33.6 |
| 4,611,016 A | 9/1986 | Hinsken et al. | 529/99 |
| 4,797,511 A | 1/1989 | Capolupo et al. | 174/110 |
| 4,837,259 A | 6/1989 | Chucta | 524/258 |
| 5,175,312 A | 12/1992 | Dubs et al. | 549/307 |
| 5,308,899 A | 5/1994 | Michaelis | |
| 5,422,415 A * | 6/1995 | Michaelis | 521/90 |
| 5,516,920 A | 5/1996 | Nesvadba et al. | 549/307 |
| 5,607,624 A | 3/1997 | Nesvadba et al. | 252/589 |
| 5,807,505 A | 9/1998 | Nesvadba et al. | 252/406 |
| 6,103,794 A | 8/2000 | Laver | |
| 6,224,791 B1 * | 5/2001 | Stevenson et al. | 252/589 |

FOREIGN PATENT DOCUMENTS

| EP | 0415887 A2 | 8/1990 |
|---|---|---|
| EP | 867467 | 9/1998 |
| WO | 99/03915 | 1/1999 |
| WO | WO9923154 | 5/1999 |

OTHER PUBLICATIONS

Kronke, C.; A Major Breakthrough in Polymer Stabilization; Proceedings from Polyolefinsx International Conference (1997); pp. 555–569.

* cited by examiner

Primary Examiner—Robert Dawson
Assistant Examiner—Marc S. Zimmer
(74) Attorney, Agent, or Firm—Michael P. Dilworth

(57) ABSTRACT

A composition is disclosed comprising:
(A) a thermoplastic resin; and
(B) a stabilizing amount of a blend of at least one sterically hindered phenol antioxidant, at least one aromatic amine and/or N,N'-substituted oxamide antioxidant, and at least one lactone antioxidant having a 3-phenylbenzofuran-2-one structure.

A method is also disclosed for stabilizing a thermoplastic resin, wherein the method comprises adding thereto a stabilizing amount of a blend of at least one sterically hindered phenol antioxidant, at least one aromatic amines and/or N,N'-substituted oxamide antioxidant, and at least one lactone antioxidant having a 3-phenylbenzofuran-2-one structure.

52 Claims, No Drawings

THERMOPLASTIC RESINS STABILIZED BY BLENDS OF STERICALLY HINDERED PHENOLS, SECONDARY AMINES, AND LACTONES

BACKGROUND OF THE INVENTION

1. Field of the Invention

The present invention relates to the oxidative stabilization of organic materials, especially polyolefin-based thermoplastic resins. More particularly, the present invention relates to the oxidative stabilization of thermoplastic resins with synergistic blends of (1) secondary aromatic amines and/or N,N'-substituted oxamides, (2) sterically hindered phenols, and (3) lactones having a base structure of a 3-phenylbenzofuran-2-one.

2. Description of Related Art

Manufacturers of plastic goods have experienced a long-standing problem in stabilizing plastic resins during the high temperature, high shear, blending, and extrusion processes that are common in the industry. Resins that show excellent long-term heat stability characteristics may not be sufficiently protected against the type of degradation that occurs in an extruder during long residence times or in applications where the plastic is exposed to high temperature heat fusion followed by compression molding.

U.S. Pat. No. 4,611,016 discloses a process for stabilizing organic polymeric materials comprising incorporating therein a benzofuran (2) one or indolin (2) one compound as stabilizer. Such stabilized polymeric materials are said to be stabilized against degradation during the polymer processing.

U.S. Pat. No. 4,797,511 discloses a composition stabilized against oxidative degradation comprising: a polyolefin, carbon black homogeneously incorporated in said polyolefin, a stabilizing amount of thiodiethylene bis(3,5-di-t-butyl-4-hydroxy)hydrocinnamate first stabilizer component incorporated into said polyolefin and a second stabilizer component of at least one amine antioxidant selected from the group consisting of a para-substituted aralkyl-substituted diphenylamine; a para-phenylenediamine and a polymerized dihydroquinoline incorporated into said polyolefin.

U.S. Pat. No. 4,837,259 discloses polypropylene stabilized against oxidative degradation by the presence therein of a stabilizing amount of an antioxidant composition that comprises:

(a) at least one aralkyl-substituted diarylamine; and
(b) at least one sterically hindered phenol.

U.S. Pat. No. 5,175,312 discloses compounds of the formula

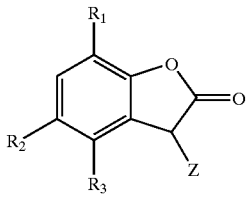

in which $R_1$ is $C_{13}$–$C_{30}$ alkyl, $R_2$ is hydrogen, $C_1$–$C_{10}$ alkyl, $C_5$–$C_{12}$ cycloalkyl, $C_5$–$C_7$ cycloalkyl which is substituted by $C_1$–$C_4$ alkyl, or is phenyl or $C_7$–$C_{12}$ phenylalkyl, $R_3$ is hydrogen or $C_1$–$C_4$ alkyl and Z is phenyl, phenyl which is substituted by $C_1$–$C_8$ alkyl, $C_1$–$C_4$ alkoxy or chlorine, a group

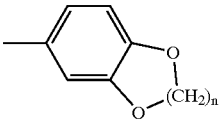

n which n is 1 or 2 or a group

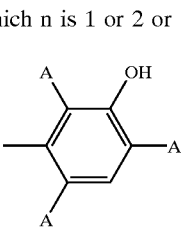

in which the radicals A independently of one another are $C_1$–$C_8$ alkyl, methoxy or ethoxy, that are said to be suitable for stabilizing organic material against oxidative, thermal and actinic degradation.

U.S. Pat. No. 5,516,920 discloses compounds of the formula

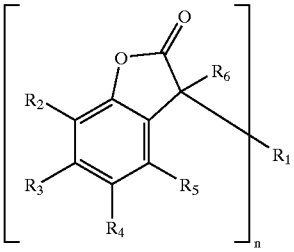

as stabilisers for protecting organic materials, in particular polymers and lubricants, against thermal, oxidative or light-induced degradation.

U.S. Pat. No. 5,607,624 discloses a process for the preparation of 3-arylbenzofuranones of a defined structure similar to the above.

U.S. Pat. No. 5,807,505 discloses compounds of the formula

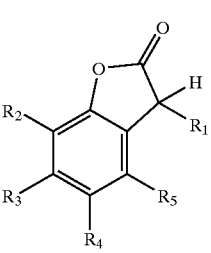

as stabilizers for protecting organic materials against thermal, oxidative or light-induced degradation.

WO 99/03915 discloses synergistic blends of phosphites and lactones having a base structure of 3-phenylbenzofuran-2-one with or without other additives as stabilizers for polymers, particularly during melt processing as evidenced by changes in melt flow and in some instances, resistance to yellowing.

Kronke, C., *Proceedings from Polyolefins X International Conference;* pp. 555–569 (1997) discloses, inter alia, an extremely active stabilizer for polyolefin processing based on a benzofuranone (lactone) derivative. The author states that, when used in combination with phenolic/phosphite antioxidant blends, new levels of performance are achieved.

The disclosures of the foregoing are incorporated herein by reference in their entirety.

SUMMARY OF THE INVENTION

The present invention is characterized by a polymeric material that includes a stabilizing mixture comprising at least three components. The first component is a secondary aromatic amine, the second component is a sterically hindered phenol, and the third component is a lactone having a base structure of a 3-phenylbenzofuran-2-one.

The synergistic effect of blends of secondary aromatic amines and/or N,N'-substituted oxamides and hindered phenols when used to stabilize polyolefins is known in the art. However, the use of these blends suffers from a major drawback, i.e., they have been found to a furnish sub-par performance as stabilizers during melt processing, especially when subjected to multiple pass extrusion testing, as evidenced by measuring retention of melt-flow rate and resistance to yellowing. Multiple pass extrusion is a very common test method to assess the process stabilization afforded to a polymer. Moreover, this lack of processing stabilization effect has impeded the more widespread use of secondary aromatic arnine/phenol blends in more demanding applications as far as processing stabilization is concerned.

It has now, surprisingly, been found that this impediment to the use of secondary aromatic amines and/or N,N'-substituted oxamide/phenol blends as processing stabilizers can be circumvented when a third component, chosen from the class of 2-phenylbenzofuran-2-one lactones, is included, thus giving a ternary blend. Thus, the present invention is directed to the discovery that various combinations of secondary aromatic amines and/or N,N'-substituted oxamides and sterically hindered phenols form synergistic blends with 3-phenylbenzofuran-2-one lactone with tremendously improved process stabilization, as evidenced by retention of melt flow rate and, in some cases, resistance to yellowing on multiple pass extrusion.

More particularly, the present invention is directed to a composition comprising:

(A) a thermoplastic resin; and
(B) a stabilizing amount of a blend of at least one sterically hindered phenol antioxidant, at least one secondary aromatic amine and/or N,N'-substituted oxamide antioxidant, and at least one lactone antioxidant having a 3-phenylbenzofuran-2-one structure.

In a preferred embodiment, the present invention is directed to a composition comprising:

(A) a thermoplastic resin; and
(B) a stabilizing amount of:
   (1) a first stabilizer comprising at least one secondary aromatic amine and/or N,N'-substituted oxamide antioxidant selected from the group consisting of
      (i) a hydrocarbon-substituted diarylamine,
      (ii) a reaction product of a diarylamine and an aliphatic ketone,
      (iii) an N,N'-hydrocarbon Substituted para-phenylenediamine, and
      (iv) a polymerized dihydroquinoline;
   (2) a second stabilizer comprising at least one sterically hindered phenol antioxidant; and
   (3) a third stabilizer comprising at least one lactone antioxidant of the structure

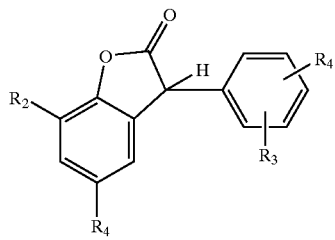

wherein
$R_1$ and $R_2$ are independently selected from the group consisting of hydrogen, chloro, hydroxy, $C_1$–$C_{25}$ alkyl, $C_7$–$C_9$-phenylalkyl, unsubstituted or $C_1$–$C_4$ alkyl-substituted phenyl, unsubstituted or $C_1$–$C_4$ alkyl-substituted $C_5$–$C_8$ cycloalkyl; $C_1$–$C_{18}$ alkoxy, $C_1$–$C_{18}$ alkylthio, $C_1$–$C_4$ alkylamino, di-($C_1$–$C_4$ alkyl)amino, $C_1$–$C_{25}$ alkanoyloxy, $C_1$–$C_{25}$ alkanoylamino, $C_3$–$C_{25}$ alkenoyloxy, $C_3$–$C_{25}$ alkanoyloxy which is interrupted by oxygen, sulfur or >N—$R_8$; $C_6$–$C_9$ cycloalkylcarbonyloxy, benzoyloxy or $C_1$–$C_{12}$ alkyl-substituted benzoyloxy;
$R_8$ is hydrogen or $C_1$–$C_8$ alkyl; and
$R_3$ and $R_4$ are independently selected from the group consisting of $C_1$–$C_8$ alkyl, $C_1$–$C_4$ alkoxy, halogen, a group

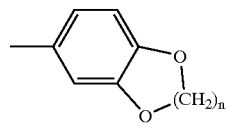

in which n is 1 or 2, or a group

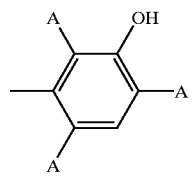

in which the radicals A are independently selected from the group consisting of $C_1$–$C_8$ alkyl and $C_1$–$C_8$ alkoxy.

In another aspect, the present invention is directed to a method for stabilizing a composition comprising a thermoplastic resin comprising adding thereto a stabilizing amount of a blend of at least one sterically hindered phenol antioxidant, at least one secondary aromatic amine and/or N,N'-substituted oxamide antioxidant, and at least one lactone antioxidant having a 3-phenylbenzofuran-2-one structure.

In a preferred embodiment of this aspect, the present invention is directed to a method for stabilizing a composition comprising a thermoplastic resin against oxidative degradation comprising adding to said composition a stabilizing amount of:

(A) a first stabilizer comprising at least one secondary aromatic amine and/or N,N'-substituted oxamide antioxidant selected from the group consisting of
  (i) a hydrocarbon-substituted diarylamine,
  (ii) a reaction product of a diarylamine and an aliphatic ketone,
  (iii) an N,N'-hydrocarbon substituted para-phenylenediamine, and
  (iv) a polymerized dihydroquinoline;
(B) a second stabilizer comprising at least one sterically hindered phenol antioxidant; and
(C) a third stabilizer comprising at least one lactone antioxidant of the structure

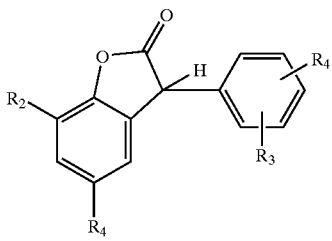

wherein
$R_1$ and $R_2$ are independently selected from the group consisting of hydrogen, chloro, hydroxy, $C_1$–$C_{25}$ alkyl, $C_7$–$C_9$-phenylalkyl, unsubstituted or $C_1$–$C_4$ alkyl-substituted phenyl, unsubstituted or $C_1$–$C_4$ alkyl-substituted $C_5$–$C_8$ cycloalkyl, $C_1$–$C_{18}$ alkoxy, $C_1$–$C_{18}$ alkylthio, $C_1$–$C_4$ alkylamino, di-($C_1$–$C_4$ alkyl)amino, $C_1$–$C_{25}$ alkanoyloxy, $C_1$–$C_{25}$ alkanoylamino, $C_3$–$C_{25}$ alkenoyloxy, $C_3$–$C_{25}$ alkanoyloxy which is interrupted by oxygen, sulfur or >N—$R_8$; $C_6$–$C_9$ cycloalkylcarbonyloxy, benzoyloxy or $C_1$–$C_{12}$ alkyl-substituted benzoyloxy;
$R_8$ is hydrogen or $C_1$–$C_8$ alkyl; and
$R_3$ and $R_4$ are independently selected from the group consisting of hydrogen, $C_1$–$C_8$ alkyl, $C_1$–$C_4$ alkoxy, halogen, a group

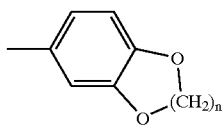

n which n is 1 or 2, or a group

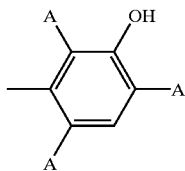

in which the radicals A are independently selected from the group consisting of $C_1$–$C_8$ alkyl and $C_1$–$C_8$ alkoxy.

DESCRIPTION OF THE PREFERRED EMBODIMENTS

The present invention is characterized by a polymeric material to which a stabilizing mixture comprising at least three components has been added. Polymeric materials afforded stabilization by the stabilizing mixtures of the present invention are from the group of thermoplastic resins, especially polyolefins, preferably polypropylene. Further included are such thermoplastic resins to which certain inorganic filler materials, e.g., glass, have been added, up to a level of about 50 percent of the total weight of the glass and resin.

A further preferred embodiment of the present invention includes the presence of carbon black in the polymer or glass filled polymer. The carbon black is useful, inter alia, for providing resistance to the effects of ultraviolet light.

The thermoplastic resins that can be stabilized against oxidative degradation employing the ternary mixtures of the present invention include resins derived from ethylene including low density polyethylene (LDPE), linear low density polyethylene (LLDPE), medium density polyethylene (MDPE), high density polyethylene (HDPE), or other ethylene derived resins that have densities from 0.85 to 1.4 gm/cm$^3$; homopolymers derived from mono- and di-ethylenically unsaturated hydrocarbon monomers of $C_3$ and above, such as, polypropylene, polyisobutylene, polymethylbutene-1, polymethylpentene-1, polybutene-1, polyisobutylene, and the like; copolymers derived from two or more monomers, such as, ethylene-propylene copolymers, preferably having at least a majority of propylene, propylene-butene-1 copolymers, propylene-isobutylene copolymers, and the like, and blends thereof, polystyrenes; polyvinylhalides; and engineering thermoplastics, for example, polyamides, polyesters, polyphenyleneoxides, polyphenylenesulfides, polyacetals, aliphatic polyketone co- or terpolymers, poly (ethersulfones), polycarbonates, liquid crystalline polymers, poly(etheretherketones), and poly(arylates). It is preferred that the thermoplastic resin that is protected by the stabilizing blends of the present invention be a polyolefin, PET, PBT, polystyrene, a polyacrylic, a polycarbonate, PVC, EPDM, SAN, PPO, SBR, ABS, or a nylon, more preferred that it be a polyolefin, and most preferred that it be polypropylene.

As stated above, one of the components in the stabilizing blend incorporated in the thermoplastic resin, whether or not it contains glass and/or carbon black, is a sterically hindered phenol. Another component is a secondary aromatic amine and/or an N,N'-substituted oxamide, and a third component is a lactone antioxidant having a 3-phenylbenzofuran-2-one structure. These blends of sterically hindered phenols, secondary aromatic amines and/or N,N'-substituted oxamides, and lactones have unexpectedly been found to protect thermoplastic resins, e.g., polypropylene, optionally in the presence of carbon black and/or glass, from polymer breakdown, as evidenced by retention of melt flow rate and, in some cases, resistance to yellowing upon multiple pass extrusion.

It has further been found that the stabilizing three-component blend may be made up from two different secondary aromatic amines and/or N,N'-substituted oxamides and at least one lactone, provided that one of the secondary aromatic amines and/or N,N'-substituted oxamides employed also possesses hindered phenol functionality. Thus, in the practice of the present invention, there must be at least three separate components, i.e., there must be a component having secondary aromatic amine and/or N,N'-substituted oxamide functionality, there must be a component having hindered phenol functionality, and there must be a component having the above defined lactone functionality.

The sterically hindered phenols that are useful in the practice of the present invention are preferably selected from the group consisting of hindered phenols having a molecular weight above 500 Da. Preferred examples include 2,4-dimethyl-6-octyl-phenol; 2,6-di-t-butyl-4-methyl phenol (i.e., butylated hydroxy toluene); 2,6-di-t-butyl-4-ethyl phenol; 2,6-di-t-butyl-4-n-butyl phenol; 2,2'-methylenebis(4-methyl-6-t-butyl phenol); 2,2'-methylenebis(4-ethyl-6-t-butyl phenol); 2,4-dimethyl-6-t-butyl phenol; 4-hydroxymethyl-2, 6-di-t-butyl phenol; n-octadecyl-beta(3, 5-di-t-butyl-4-hydroxyphenyl)propionate; 2,6-dioctadecyl-4-methyl phenol; 2,4,6-trimethyl phenol; 2,4,6-triisopropyl phenol; 2,4,6-tri-t-butyl phenol; 2-t-butyl-4,6-dimethyl phenol; 2,6-methyl-4-didodecyl phenol; tris(3,5-di-t-butyl-4-hydroxy isocyanurate, and tris(2-methyl-4-hydroxy-5-t-butylphenyl)butane.

More preferred are octadecyl-3,5-di-t-butyl-4-hydroxy-hydrocinnamate (NAUGARD 76, Uniroyal Chemical; IRGANOX 1076, Ciba-Geigy); tetrakis{methylene(3,5-di-t-butyl-4-hydroxy-hydrocinnamate)}methane (NAUGARD 10, Uniroyal Chemical; IRGANOX 1010, Ciba-Geigy); 2,2'-oxamido bis{ethyl-3-(3,5-di-t-butyl-4-hydroxyphenyl)} propionate (NAUGARD XL-1, Uniroyal Chemical); 1,2-bis (3,5-di-t-butyl-4-hydroxyhydrocinnamoyl)hydrazine (IRGANOX MD 1024,Ciba-Geigy); 1,3,5-tris(3,5-di-t-butyl-4-hydroxybenzyl)-s-triazine-2,4,6 (1H,3H,5H)trione (IRGANOX 3114,Ciba-Geigy); 1,3,5-tris(4-t-butyl-3-hydroxy-2,6-dimethylbenzyl)-s-triazine-2,4,6-(1H,3H,5H) trione (CYANOX 1790, American Cyanamid Co.); 1,3,5-trimethyl-2,4,6-tris(3,5-di-t-butyl-4-hydroxybenzyl) benzene (ETHANOX 330, Ethyl Corp.); 3,5-di-t-butyl-4-hydroxyhydrocinnamic acid triester with 1,3,5-tris(2-hydroxyethyl)-5-triazine-2,4,6(1H,3H,5H)-trione, and bis(3, 3-bis(4-hydroxy-3-t-butylphenyl)butanoic acid)glycolester.

Most preferred are the hindered phenols having molecular weights above 700, especially polyphenols that contain three or more substituted phenol groups, such as tetrakis{methylene(3,5-di-t-butyl-4-hydroxy-hydrocinnamate)}methane and 1,3,5-trimethyl-2,4,6-tris(3, 5-di-t-butyl-4-hydroxybenzyl)benzene.

The secondary aromatic amines that are useful in the practice of the present invention can be represented by the general formula $$R^1\text{—NH—}R^2$$

where $R^1$ and $R^2$ may be, but are not necessarily, identical. Thus, in a preferred embodiment, $R^1$ and $R^2$ can be independently selected from the group consisting of (i) aromatic carbon, (ii) aliphatic $R^1$ and aromatic $R^2$ carbon atoms, and (iii) aromatic carbon linked to a second nitrogen atom to give a phenylene diamine.

Where $R^1$ is aliphatic, it can be straight chain or branched and can have from one to twelve carbon atoms, e.g., methyl, ethyl, propyl, butyl, pentyl, hexyl, heptyl, octyl, nonyl, decyl, undecyl, dodecyl, and isomers thereof. It is preferred that, where $R^1$ is aliphatic, it be a straight or branched chain aliphatic group having from one to eight carbon atoms, and more preferred that it have from one to four carbon atoms.

The amine antioxidants can be hydrocarbon substituted diarylamines, such as, aryl, alkyl, alkaryl, and aralkyl substituted diphenylamine antioxidant materials. A nonlimiting list of commercially available hydrocarbon substituted diphenylamines includes substituted octylated, nonylated, and heptylated diphenylamines and para-substituted styrenated or α-methyl styrenated diphenylamines. The sulfur-containing hydrocarbon substituted diphenylamines, such as p-(p-toluenesulfonylamido)diphenylamine, i.e.,

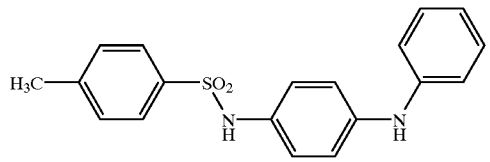

are also considered as part of this class.

Hydrocarbon-substituted diarylamines that are useful in the practice of this invention can be represented by the general formula $$\text{Ar—NH—Ar'}$$

wherein Ar and Ar' are independently selected aryl radicals, at least one of which is preferably substituted with at least one alkyl radical. The aryl radicals can be, for example, phenyl, biphenyl, terphenyl, naphthyl, anthryl, phenanthryl, and the like. The alkyl substituent(s) can be, for example, methyl, ethyl, propyl, butyl, pentyl, hexyl, heptyl, octyl, nonyl, decyl, isomers thereof, and the like.

Preferred hydrocarbon-substituted diarylamines are those disclosed in U.S. Pat. Nos. 3,452,056 and 3,505,225, the disclosures of which are incorporated by reference herein. The preferred hydrocarbon-substituted diarylamines an be represented by the following general formulas:

(I)

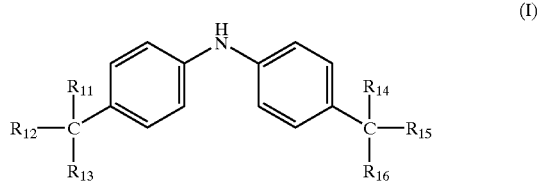

where $R_{11}$ is selected from the group consisting of phenyl and p-tolyl radicals;

$R_{12}$ and $R_{13}$ are independently selected from the group consisting of methyl, phenyl, and p-tolyl radicals;

$R_{14}$ is selected from the group consisting of methyl, phenyl, p-tolyl, and neopentyl radicals;

$R_{15}$ is selected from the group consisting of methyl, phenyl, p-tolyl, and 2-phenylisobutyl radicals; and, $R_{16}$ is a methyl radical.

(II)

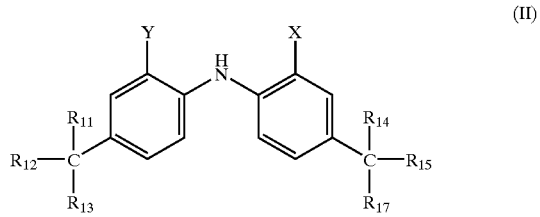

where $R_{11}$ through $R_{15}$ are independently selected from the radicals shown in Formula I and $R_{17}$ is selected from the group consisting of methyl, phenyl, and p-tolyl radicals;

X is a radical selected from the group consisting of methyl, ethyl, $C_3$–$C_{10}$ sec-alkyl, α,α-dimethylbenzyl, α-methylbenzyl, chlorine, bromine, carboxyl, and metal salts of the carboxylic acids where the metal is selected from the group consisting of zinc, cadmium, nickel, lead, tin, magnesium, and copper; and, Y is a radical selected from the group consisting of hydrogen, methyl, ethyl, $C_3$–$C_{10}$ sec-alkyl, chlorine, and bromine.

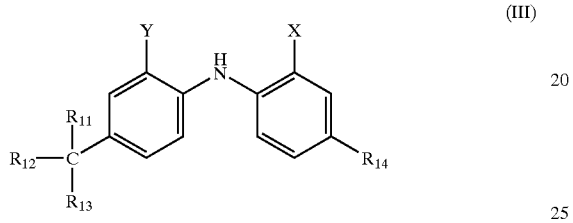

(III)

where $R_{11}$ is selected from the group consisting of phenyl or p-tolyl radicals;

$R_{12}$ and $R_{13}$ are independently selected from the group consisting of methyl, phenyl, and p-tolyl radicals;

$R_{14}$ is a radical selected from the group consisting of hydrogen, $C_3$–$C_{10}$ primary, secondary, and tertiary alkyl, and $C_3$–$C_{10}$ alkoxyl, which may be straight chain or branched; and X and Y are radicals selected from the group consisting of hydrogen, methyl, ethyl, $C_3$–$C_{10}$ sec-alkyl, chlorine, and bromine.

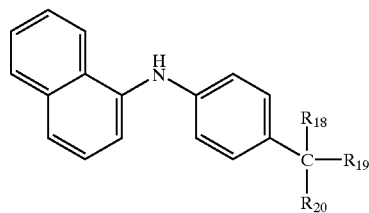

(IV)

where $R_{18}$ is selected from the group consisting of phenyl and p-tolyl radicals;

$R_{19}$ is a radical selected from the group consisting of methyl, phenyl, p-tolyl and 2-phenyl isobutyl; and $R_{20}$ is a radical selected from the group consisting of methyl, phenyl, and p-tolyl.

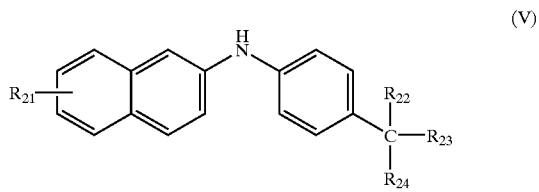

(V)

where $R_{21}$ is selected from the group consisting of hydrogen, α,α-dimethylbenzyl, α-methylbenzhydryl, triphenylmethyl, and α,α p-trimethylbenzyl radicals;

$R_{22}$ is selected from the group consisting of phenyl or p-tolyl radicals;

$R_{23}$ is selected from the group consisting of methyl, phenyl, and p-tolyl radicals; and $R_{24}$ is selected from the group consisting of methyl, phenyl, p-tolyl, and 2-phenylisobutyl radicals.

Typical chemicals useful in the invention are as follows:

TYPE I

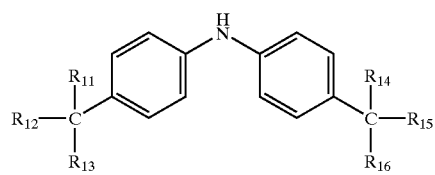

| $R_{11}$ | $R_{12}$ | $R_{13}$ | $R_{14}$ | $R_{15}$ | $R_{16}$ |
|---|---|---|---|---|---|
| Phenyl | Methyl | Methyl | Phenyl | Methyl | Methyl |
| Phenyl | Phenyl | Methyl | Phenyl | Phenyl | Methyl |
| Phenyl | Phenyl | Phenyl | Neopentyl | Methyl | Methyl |
| p-Tolyl | Methyl | Methyl | p-Tolyl | Methyl | Methyl |

-continued

TYPE II

| $R_{11}$ | $R_{12}$ | $R_{13}$ | $R_{14}$ | $R_{15}$ | $R_{17}$ | X | Y |
|---|---|---|---|---|---|---|---|
| Phenyl | Methyl | Methyl | Phenyl | Methyl | Methyl | α,α-Dimethyl-benzyl | Hydrogen |
| Phenyl | Methyl | Methyl | Phenyl | Methyl | Methyl | Bromo | Bromo |
| Phenyl | Methyl | Methyl | Phenyl | Methyl | Methyl | Carboxyl | Hydrogen |
| Phenyl | Methyl | Methyl | Phenyl | Methyl | Methyl | Nickel carboxylate | Hydrogen |
| Phenyl | Methyl | Methyl | Phenyl | Methyl | Methyl | 2-Butyl | Hydrogen |
| Phenyl | Methyl | Methyl | Phenyl | Methyl | Methyl | 2-Octyl | Hydrogen |
| Phenyl | Phenyl | Phenyl | Phenyl | Phenyl | Phenyl | 2-Hexyl | Hydrogen |

TYPE III

| $R_{11}$ | $R_{12}$ | $R_{13}$ | $R_{14}$ | X | Y |
|---|---|---|---|---|---|
| Phenyl | Methyl | Methyl | Isopropoxy | Hydrogen | Hydrogen |
| Phenyl | Methyl | Methyl | Hydrogen | 2-Octyl | Hydrogen |
| Phenyl | Phenyl | Phenyl | Hydrogen | 2-Hexyl | Hydrogen |

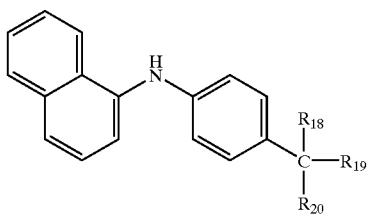

TYPE IV where $R_{18}$ is phenyl and $R_{19}$ and $R_{20}$ are methyl.

Of the foregoing preferred hydrocarbon-substituted diarylamines, the substituted diphenylamines of the formula:

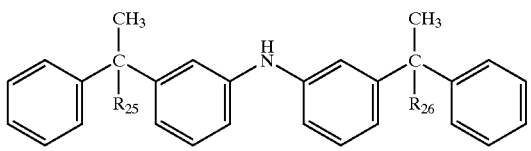

where $R_{25}$ and $R_{26}$ are methyl or phenyl are especially preferred. The compound wherein $R_{25}$ and $R_{26}$ are both methyl is 4,4'-bis(α,α-dimethylbenzyl)diphenylamine and the compound wherein $R_{25}$ and $R_{26}$ are both phenyl is 4,4'-bis(α-methylbenzyl)diphenylamine.

A second class of amine antioxidants comprises the reaction products of a diarylamine and an aliphatic ketone. The diarylamine aliphatic ketonereaction products that are useful herein are disclosed in U.S. Pat. Nos. 1,906,935; 1,975,167; 2,002,642; and 2,562,802. Briefly described, these products are obtained by reacting a diarylamine, preferably a diphenylamine, which may, if desired, possess one or more substituents on either aryl group, with an aliphatic ketone, preferably acetone, in the presence of a suitable catalyst. In addition to diphenylamine, other suitable diarylamine reactants include dinaphthyl amines; p-nitrodiphenylamine; 2,4-dinitrodiphenylamine; p-aminodiphenylamine; p-hydroxydiphenylamine; and the like. In addition to acetone, other useful ketone reactants include methylethylketone, diethylketone, monochloroacetone, dichloroacetone, and the like.

A preferred diarylamine-aliphatic ketone reaction product is obtained from the condensation reaction of diphenylamine and acetone (NAUGARD A, Uniroyal Chemical), for example, in accordance with the conditions described in U.S. Pat. No. 2,562,802. The commercial product is supplied as a light tan-green powder or as greenish brown flakes and has a melting range of 85° to 95° C.

A third class of suitable amines comprises the N,N'hydrocarbon substituted p-phenylene diamines. The hydrocarbon substituent may be alkyl or aryl groups, which can be substituted or unsubstituted. As used herein, the term "alkyl," unless specifically described otherwise, is intended to include cycloalkyl. Representative materials are:

N-phenyl-N'-cyclohexyl-p-phenylenediamine;
N-phenyl-N'-sec-butyl-p-phenylenediamine;
N-phenyl-N'-isopropyl-p-phenylenediamine;
N-phenyl-N'-(1,3-dimethylbutyl)-p-phenylenediamine;
N,N'-bis-(1,4-dimethylpentyl)-p-phenylenediamine;
N,N'-diphenyl-p-phenylenediamine;
N,N'-di-beta naphthyl-p-phenylenediamine; mixed diaryl-p-
N,N'-bis-(1-ethyl-3-methylpentyl)-p-phenylenediamines, and
N,N'-bis-(1 methylheptyl)-p-phenylenediamine.

A fourth class of amine antioxidants comprises materials based on quinoline, especially, polymerized 1,2-dihydro-2,2,4-trimethylquinoline (Naugard Super Q, Uniroyal Chemical). Representative materials also include 6-dodecyl-2,2,4-trimethyl-1,2-dihydroquinoline; 6-ethoxy-2,2,4-trimethyl-1-2-dihydroquinoline, and the like.

Secondary amines that are especially preferred for use in the practice of the present invention are 4,4'-bis(α,αdimethylbenzyl)diphenylamine (Naugard 445, Uniroyal Chemical), octylated diphenylamine (Naugard Octamine, Uniroyal Chemical), polymerized 1,2-dihydro-2,2,4-trimethylquinoline (Naugard Super Q, Uniroyal Chemical) and p-(p-toluene-sulfonylamido)-diphenyl amine (Naugard SA, Uniroyal Chemical).

As an alternative, or in addition, to the foregoing secondary amines, material based upon an N,N'-substituted oxamide, preferably possessing hindered phenol functionality, can be used. An especially preferred member of this class is 2,2'-oxamido-bis{ethyl-3-(3,5-di-t-butyl-4-hydroxyphenyl)}propionate (Naugard XL-1, Uniroyal Chemical).

The lactones having a base structure of a 3-phenylbenzofuran-2-one that are employed in the blends of the present invention are of the structure

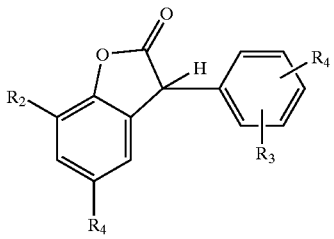

wherein
  $R_1$ and $R_2$ are independently selected from the group consisting of hydrogen; chloro; hydroxy; $C_1$–$C_{25}$ alkyl; $C_7$–$C_9$-phenylalkyl; unsubstituted or $C_1$–$C_4$ alkyl-substituted phenyl; unsubstituted or $C_1$–$C_4$ alkyl-substituted $C_5$–$C_8$ cycloalkyl; $C_1$–$C_{18}$ alkoxy; $C_1$–$C_{18}$ alkylthio; $C_1$–$C_4$ alkylamino; di-($C_1$–$C_4$ alkyl)amino; $C_1$–$C_{25}$ alkanoyloxy, $C_1$–$C_{25}$ alkanoylamino; $C_3$–$C_{25}$ alkenoyloxy; $C_3$–$C_{25}$ alkanoyloxy which is interrupted by oxygen, sulfur, or >N—$R_s$; $C_6$–$C_9$ cycloalkylcarbonyloxy; benzoyloxy or $C_1$–$C_{12}$ alkyl-substituted benzoyloxy;
  $R_8$ is hydrogen or $C_1$–$C_8$ alkyl; and
  $R_3$ and $R_4$ are independently selected from the group consisting of hydrogen, $C_1$–$C_8$ alkyl, $C_1$–$C_4$ alkoxy, halogen, a group

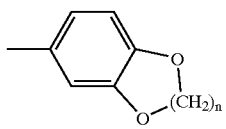

in which n is 1 or 2, or a group

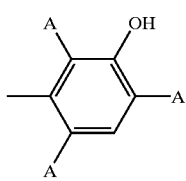

in which the radicals A are independently selected from the group consisting of $C_1$–$C_8$ alkyl and $C_1$–$C_8$ alkoxy.

A particularly useful representative of these lactones is 5,7-di-t-butyl-3-(3,4,-dimethylphenyl)-3H-benzofuran-2-one, which is of the structure

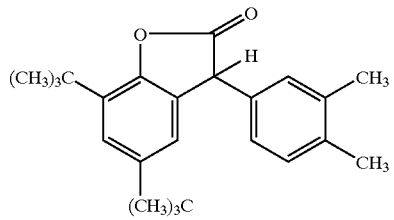

This compound is commercially available from Ciba Specialties as HP 136.

The compounds can be prepared by methods described in U.S. Pat. No. 5,516,920, the disclosure of which is incorporated herein by reference. More specifically, such compounds can be made by reacting a phenol of the formula

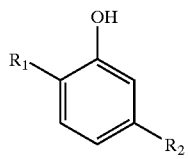

with a mandelic acid derivative of the formula

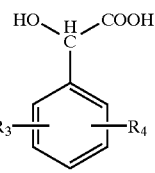

at elevated temperature, preferably in the range of from about 130° C. to about 200° C., in the melt or in a solvent, under normal pressure or a slight vacuum.

Alternatively, a compound of the formula

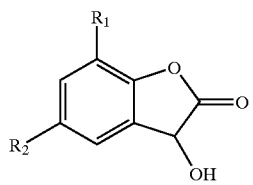

an be reacted with a compound of the formula

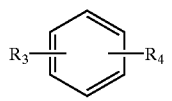

at elevated temperature, preferably in the range of from about 70° C. to about 200° C., in the melt or in a solvent, under normal pressure or a slight vacuum, preferably in the presence of a catalyst, such as, a protonic acid, a Lewis acid, an aluminum silicate, an ion exchange resin, a zeolite, a naturally occurring sheet silicate, or a modified sheet silicate.

The combined amounts of the amine/oxamide derivative(s), hindered phenol(s), and lactone(s) incorporated into the thermoplastic resins of the present invention, which may contain glass and/or carbon black, will at a minimum be that required to impart a significant level of stability against oxidative degradation. In general, such amounts can vary from about 0.01 to about 10.0 weight percent, and preferably from about 0.2 to about 5 weight percent, of the thermoplastic resin blend. Although combined amounts of the antioxidants in excess of about 10 weight percent can be employed, such amounts may have a deleterious effect on the physical and mechanical properties of the polymeric substrate, in which case they should ordinarily be avoided.

For the blends of secondary aromatic amines, sterically hindered phenols, and lactones, the lactone is added in a synergistic amount. The relative proportions of secondary aromatic amine to sterically hindered phenol to lactone can vary widely. In general, the ratios of secondary aromatic amine:sterically hindered phenol:lactone may be any ratio between 100:100:1 and 0.01:0.01:1. A preferred range is from 20:20:1 to 0.1:0.1:1. Additionally, two or more secondary aromatic amines, two or more sterically hindered phenols, and/or two or more lactones may be blended together in any ratio to make the secondary aromatic amine/sterically hindered phenol/lactone blend.

Preferred secondary aromatic amine/sterically hindered phenol/lactone blends are blends of 4,4'-bis($\alpha,\alpha$-dimethylbenzyl) diphenylamine with either octadecyl 3,5-di-t-butyl-4-hydroxy-hydrocinnarnate, tetrakis{(methylene (3,5-di-t-butyl-4-hydroxyhydrocinnamate)}methane, or 2,2'-oxamido bis{ethyl-3-(3,5-di-tert-butyl-4-hydroxyphenyl)}propionate with 5,7-di-t-butyl-3-(3,4-dimethylphenyl)-3H-benzofuran-2-one; blends of polymerized 1,2-dihydro-2,2,4-trimethylquinoline with either octadecyl 3,5-di-t-butyl-4-hydroxyhydrocinnamate, tetrakis{methylene(3,5-di-t-butyl-4-hydroxyhydrocinnamate)}methane, or 2,2'-oxamido bis{ethyl-3-(3,5-di-tert-butyl-4-hydroxyphenyl)}propionate with 5,7-di-t-butyl-3-(3,4-dimethylphenyl)-3H-benzofuran-2-one; and blends of p-(p-toluenesulfonylamido)-diphenylamine with either octadecyl 3,5-di-t-butyl-4-hydroxyhydrocinnamate, tetrakis{methylene(3,5-di-t-butyl-4-hydroxy-hydrocinnamate)}methane, or 2,2'-oxamido bis{ethyl-3-(3, 5-di-tert-butyl-4-hydroxyphenyl)}propionate with 5,7-di-t-butyl-3-(3,4-dimethylphenyl)-3H-benzofuran-2-one.

As described above, it is possible to employ an antioxidant in the practice of the present invention that has both secondary aromatic amine/oxamide and hindered phenol functionality. Where this is done, such a difunctional antioxidant can take the place of either the secondary aromatic amine and/or N,N'-substituted oxamide antioxidant of the invention or the hindered phenol of the invention, but not both. Thus, the proportions described in the preceding paragraph will still apply.

If desired, glass can be present in the thermoplastic resin employed in the practice of the present invention in an amount of up to about 50 percent by weight of the thermoplastic resin. Preferably, when glass is present, it will be in an amount ranging from about 5 to about 50 percent by weight, more preferably from about 20 to about 40 percent by weight.

If desired, carbon black can be present in the thermoplastic resin in an amount up to about 10 percent by weight of the thermoplastic resin. It is preferably present in an amount ranging from about 0.01 to about 10 percent by weight and, more preferably, in an amount ranging from about 0.1 to about 5 percent by weight.

The procedures employed to incorporate the amine/oxamide derivative(s), the hindered phenol(s), and the lactone(s) into the thermoplastic resins are not critical and, in general, follow any of the known procedures for incorporating additives into such resins. For example, these materials can be introduced into the thermoplastic resin as a premix or they can be maintained separately and added to the resin simultaneously or sequentially and then homogeneously distributed throughout the polymer by milling, extrusion blending, or some other mechanical working procedure. Either the first, the second, or the third stabilizer, or two of the foregoing, or all three can be added to the thermoplastic resin by way of a preconcentrate or in a carrier system, for example, in a suitable solvent or cosolvent.

Following common practice, other additives can be introduced-into the resin prior to, during, and/or following addition of the antioxidants. Such additives include other stabilizers, colorants, reinforcements, fillers, antistatic agents, lubricants, plasticizers, and the like, present in the customary amounts.

Various features and aspects of the present invention are illustrated further in the examples that follow. While these examples are presented to show one skilled in the art how to operate within the scope of the invention, they are not intended in any way to serve as a limitation upon the scope of the invention.

EXAMPLES

Example 1

This example compares blends of 4,4'-bis($\alpha$, $\alpha$dimethylbenzyl)diphenylamine with various added antioxidants with and without a lactone. Thus, 5,7-di-t-butyl-3-(3,4-dimethylphenyl)-3H-benzofuran-2-one was added to a mixture of 4,4'-bis($\alpha,\alpha$dimethylbenzyl)diphenylamine, and various sterically hindered phenolic antioxidants listed below as PA1, PA2, and PA3. The ingredients were thoroughly mixed to form the desired blend.

The sterically hindered phenols PA1, PA2, and PA3 were, respectively, octadecyl-3,5-di-t-butyl-4-hydroxyhydrocinnamate, tetrakis{methylene(3,5-di-t-butyl-4-hydroxyhydrocinnamate)}methane, and 2,2'-oxamido bis{ethyl-3-(3,5-di-tert-butyl-4-hydroxyphenyl)}propionate The following blends were prepared:

Blend 1:

| | |
|---|---|
| 4,4'-bis($\alpha,\alpha$ dimethylbenzyl)diphenylamine | 425 parts |
| PA1 | 425 parts |
| 5,7-di-t-butyl-3(3,4-dimethylphenyl)-3H-benzofuran-2-one | 150 parts |

Blend 2:

| | |
|---|---|
| 4,4'-bis($\alpha,\alpha$ dimethylbenzyl)diphenylamine | 425 parts |
| PA2 | 425 parts |
| 5,7-di-t-butyl-3(3,4-dimethylphenyl)-3H-benzofuran-2-one | 150 parts |

Blend 3:

| | |
|---|---|
| 4,4'-bis($\alpha,\alpha$ dimethylbenzyl)diphenylamine | 425 parts |
| PA3 | 425 parts |
| 5,7-di-t-butyl-3(3,4-dimethylphenyl)-3H-benzofuran-2-one | 150 parts |

In addition the following control blends were prepared:

Control Blend 1:

| | |
|---|---|
| 4,4'-bis($\alpha,\alpha$ dimethylbenzyl)diphenylamine | 500 parts |
| PA1 | 500 parts |

Control Blend 2:

| | |
|---|---|
| 4,4'-bis($\alpha,\alpha$ dimethylbenzyl)diphenylamine | 500 parts |
| PA2 | 500 parts |

Control Blend 3:

| | |
|---|---|
| 4,4'-bis($\alpha,\alpha$ dimethylbenzyl)diphenylamine | 500 parts |
| PA3 | 500 parts |

The polypropylene was then subjected to multiple pass extrusion at 275° C. and 50 RPM using a Brabender PL 2000 single-screw laboratory extruder. The melt flow (ASTM 1238) was measured after the first and fifth passes with a Tinius Olsen extrusion plastometer. The yellowness index was also measured after the first and fifth passes, using a Hunter Lab model D25 calorimeter. The results from multiple pass extrusion testing are given in Table 1.

TABLE 1

Evaluation of Blends 1–3 by Multiple Pass Extrusion Testing

| Blend | Melt Flow Rate (g/10 min) | | Color (YI) | |
|---|---|---|---|---|
| | 1st Pass | 5th Pass | 1st Pass | 5th Pass |
| Blend 1 | 3.6 | 4.6 | 3.5 | 5.0 |
| Control Blend 1 | 5.9 | 11.6 | 3.8 | 7.3 |
| Blend 2 | 3.8 | 4.9 | 3.6 | 5.3 |
| Control Blend 2 | 5.5 | 9.8 | 3.7 | 6.8 |
| Blend 3 | 3.6 | 4.8 | 3.7 | 5.9 |
| Control Blend 3 | 5.5 | 10.3 | 4.4 | 13.9 |

As can be seen in Table 1, in every case where blends comprise the ternary mixtures of secondary aromatic amine/sterically hindered phenol/lactone, the resultant numbers for melt flow and color are lower than for the respective controls without the lactone. A lower melt flow and lower color value is indicative of less polymer degradation or better stabilization rendered by the additives.

Example 2

This example compares blends of polymerized 1,2-dihydro-2,2,4-trimethylquinoline with various added antioxidants with and without a lactone. Thus, the lactone, 5,7-di-t-butyl-3-(3,4-dimethylphenyl)-3H-benzofuran-2-one was added to a mixture of polymerized 1,2-dihydro-2,2,4- trimethylquinoline and various sterically hindered phenolic antioxidants listed above as PA1, PA2 and PA3. The ingredients were thoroughly mixed to form the desired blend. The following blends were prepared:

Blend 4:

| | |
|---|---|
| Polymerized 1,2-dihydro-2,2,4-trimethylquinoline | 425 parts |
| PA1 | 425 parts |
| 5,7-di-t-butyl-3-(3,4-dimethylphenyl)-3H-benzofuran-2-one | 150 parts |

Blend 5:

| | |
|---|---|
| Polymerized 1,2-dihydro-2,2,4-trimethylquinoline | 425 parts |
| PA2 | 425 parts |
| 5,7-di-t-butyl-3-(3,4-dimethylphenyl)-3H-benzofuran-2-one | 150 parts |

Blend 6:

| | |
|---|---|
| Polymerized 1,2-dihydro-2,2,4-trimethylquinoline | 425 parts |
| PA3 | 425 parts |
| 5,7-di-t-butyl-3-(3,4-dimethylphenyl)-3H-benzofuran-2-one | 150 parts |

In addition the following control blends were prepared:

Control Blend 4:

| | |
|---|---|
| Polymerized 1,2-dihydro-2,2,4-trimethylquinoline | 500 parts |
| PA1 | 500 parts |

Control Blend 5:

| | |
|---|---|
| Polymerized 1,2-dihydro-2,2,4-trimethylquinoline | 500 parts |
| PA2 | 500 parts |

Control Blend 6:

| | |
|---|---|
| Polymerized 1,2-dihydro-2,2,4-trimethylquinoline | 500 parts |
| PA3 | 500 parts |

Multiple pass extrusion testing was done by adding these blends to Profax 6501 polypropylene at 1000 ppm along with 500 ppm calcium stearate. The polypropylene was then subjected to multiple pass extrusion at 275° C. and 50 RPM using a Brabender PL 2000 single-screw laboratory extruder. The melt flow (ASTM 1238) was measured after the first and fifth passes with a Tinius Olsen extrusion plastometer. The yellowness index was also measured after the first and fifth passes, using a Hunter Lab model D25 colorimeter. The results from multiple pass extrusion testing are given in Table 2.

TABLE 2

Evaluation of Blends 4–6 by Multiple Pass Extrusion Testing

| Blend | Melt Flow Rate (g/10 min) | | Color (YI) | |
|---|---|---|---|---|
| | 1st Pass | 5th Pass | 1st Pass | 5th Pass |
| Blend 4 | 3.3 | 4.9 | 5.0 | 8.4 |
| Control Blend 4 | 6.1 | 10.9 | 6.2 | 13.1 |
| Blend 5 | 3.4 | 4.8 | 5.8 | 9.1 |
| Control Blend 5 | 5.6 | 9.8 | 5.9 | 12.8 |
| Blend 6 | 3.3 | 4.7 | 5.5 | 11.4 |
| Control Blend 6 | 5.9 | 9.4 | 6.6 | 21.9 |

As can be seen in Table 2, in every case where blends comprise ternary mixtures of secondary aromatic amine/sterically hindered phenol/lactone, the resultant numbers for melt flow and color are lower than for the respective controls without the lactone. A lower melt flow and lower color value is indicative of less polymer degradation or better stabilization rendered by the additives.

Example 3

This example compares blends of p-(p-toluene-sulfonylamido)-diphenylamine with various added antioxidants with and without a lactone. Thus, the lactone, 5,7-di-t-butyl-3-(3,4-dimethylphenyl)-3H-benzofuran-2-one was added to a mixture of p-(p-toluene-sulfonylamido)-diphenylamine and various sterically hindered phenolic antioxidants listed above as PA1, PA2, and PA3. The ingredients were thoroughly mixed to form the desired blend.

The following blends were prepared:

Blend 7:

| | |
|---|---|
| p-(p-toluene-sulfonylamido)-diphenylamine | 425 parts |
| PA1 | 425 parts |
| 5,7-di-t-butyl-3-(3,4-dimethylphenyl)-3H-benzofuran-2-one | 150 parts |

Blend 8:

| | |
|---|---|
| p-(p-toluene-sulfonylamido)-diphenylamine | 425 parts |
| PA2 | 425 parts |
| 5,7-di-t-butyl-3-(3,4-dimethylphenyl)-3H-benzofuran-2-one | 150 parts |

Blend 9:

| | |
|---|---|
| p-(p-toluene-sulfonylamido)-diphenylamine | 425 parts |
| PA3 | 425 parts |
| 5,7-di-t-butyl-3-(3,4-dimethylphenyl)-3H-benzofuran-2-one | 150 parts |

In addition the following control blends were prepared:

Control Blend 7:

| | |
|---|---|
| p-(p-toulene-sulfonylamido)-diphenylamine | 500 parts |
| PA1 | 500 parts |

Control Blend 8:

| | |
|---|---|
| p-(p-toulene-sulfonylamido)-diphenylamine | 500 parts |
| PA2 | 500 parts |

Control Blend 9:

| | |
|---|---|
| p-(p-toulene-sulfonylamido)-diphenylamine | 500 parts |
| PA3 | 500 parts |

Multiple pass extrusion testing was done by adding these blends to Profax 6501 polypropylene at 1000 ppm along with 500 ppm calcium stearate. The polypropylene was then subjected to multiple pass extrusion at 275° C. and 50 RPM using a Brabender PL 2000 single-screw laboratory extruder. The melt flow (ASTM 1238) was measured after first and fifth passes with a Tinius Olsen extrusion plastometer. The results from multiple pass extrusion testing are given in Table 3.

TABLE 3

Evaluation of Blends 7–9 by Multiple Pass Extrusion Testing

| Blend | Melt Flow Rate (g/10 min) | |
|---|---|---|
| | 1st Pass | 5th Pass |
| Blend 7 | 3.7 | 5.2 |
| Control Blend 7 | 6.1 | 13.4 |
| Blend 8 | 3.7 | 5.0 |
| Control Blend 8 | 5.7 | 10.9 |
| Blend 9 | 3.7 | 5.1 |
| Control Blend 9 | 6.0 | 12.0 |

As can be seen in Table 3, in every case where blends comprise ternary mixtures of secondary aromatic amine/sterically hindered phenol/lactone, the resultant numbers for melt flow are lower than for the respective controls without the lactone. A lower melt flow is indicative of less polymer degradation or better stabilization rendered by the additives.

Example 4

This example compares blends of this invention with a commercially available blend. The following blends were prepared:

| Blend 10: | |
|---|---|
| 4,4'-bis(α,α dimethylbenzyl)diphenylamine | 500 parts |
| PA2 | 500 parts |
| 5,7-di-t-butyl-3-(3,4-dimethylphenyl)-3H-benzofuran-2-one | 167 parts |

This blend was compared with a blend based upon commercially available HP 2225 (Ciba Specialties) which comprises:

| Control Blend 11: | |
|---|---|
| Tris(2,4-di-t-butylphenyl)phosphite | 500 parts |
| PA2 | 500 parts |
| 5,7-di-t-butyl-3-(3,4-dimethylphenyl)-3H-benzofuran-2-one | 167 parts |

These blends were mixed at 1167 ppm into Profax 6501 polypropylene, along with 1000 ppm of calcium stearate and 1500 ppm of distearylthiodipropionate. The polypropylene was then subjected to multiple pass extrusion at 275° C. at 50 RPM using a Brabender PL 2000 laboratory extruder. Measurements were made after the 1st and 5th passes. The results are given in Table 4 and show that Blend 10 has better melt flow stability than does the control.

TABLE 4

Evaluation of Blend 10 and Control Blend 11 by Multiple Pass Extrusion Testing

| Blend | Melt Flow Rate (g/10 min) | | Color (YI) | |
|---|---|---|---|---|
| | 1st Pass | 5th Pass | 1st Pass | 5th Pass |
| Blend 10 | 3.8 | 5.1 | 3.3 | 4.6 |
| Control Blend 11 | 3.9 | 5.9 | 2.9 | 3.3 |

In view of the many changes and modifications that can be made without departing from principles underlying the invention, reference should be made to the appended claims for an understanding of the scope of the protection afforded the invention.

What is claimed is:
1. A composition comprising:
(A) a thermoplastic resin; and
(B) a stabilizing amount of a blend of at least one sterically hindered phenol antioxidant, at least one aromatic amine antioxidant, and at least one lactone antioxidant having a 3-phenylbenzofuran-2-one structure.
2. A composition comprising:
(A) a thermoplastic resin; and
(B) a stabilizing amount of:
(1) a first stabilizer comprising at least one aromatic amine antioxidant selected from the group consisting of:
(i) a hydrocarbon-substituted diarylamine,
(ii) a reaction product of a diarylamine and an aliphatic ketone,
(iii) an N,N'-hydrocarbon substituted para-phenylenediamine, and
(iv) a polymerized dihydroquinoline;
(2) a second stabilizer comprising at least one sterically hindered phenol antioxidant; and
(3) a third stabilizer comprising at least one lactone antioxidant of the structure

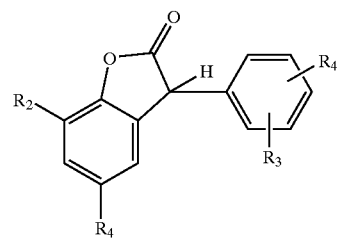

wherein
$R_1$ and $R_2$ are independently selected from the group consisting of hydrogen, chloro, hydroxy, $C_1$–$C_{25}$ alkyl, $C_7$–$C_9$-phenylalkyl, unsubstituted or $C_1$–$C_4$ alkyl-substituted phenyl, unsubstituted or $C_1$–$C_4$ alkyl-substituted $C_5$–$C_8$ cycloalkyl; $C_1$–$C_{18}$ alkoxy, $C_1$–$C_{18}$ alkylthio, $C_1$–$C_4$ alkylamino, di-($C_1$–$C_4$ alkyl)amino, $C_1$–$C_{25}$ alkanoyloxy, $C_1$–$C_{25}$ alkanoylamino, $C_3$–$C_{25}$ alkenoyloxy, $C_3$–$C_{25}$ alkanoyloxy which is interrupted by oxygen, sulfur or >$NR_8$; $C_6$–$C_9$ cycloalkylcarbonyloxy, benzoyloxy or $C_1$–$C_{12}$ alkyl-substituted benzoyloxy;
$R_8$ is hydrogen or $C_1$–$C_8$ alkyl; and
$R_3$ and $R_4$ are independently selected from the group consisting of $C_1$–$C_8$ alkyl, $C_1$–$C_4$ alkoxy, halogen, a group

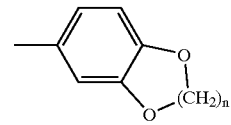

in which n is 1 or 2 or a group

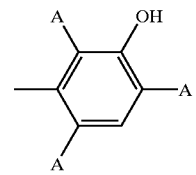

in which the radicals A are independently selected from the group consisting of $C_1$–$C_8$ alkyl and $C_1$–$C_8$ alkoxy.

3. The composition of claim 2 wherein $R_1$ and $R_2$ are independently selected alkyl groups of from 1 to 25 carbons atoms.

4. The composition of claim 3 wherein $R_1$ and $R_2$ are tert-butyl groups.

5. The composition of claim 2 wherein $R_3$ and $R_4$ are independently selected alkyl groups of from 1 to 8 carbons atoms.

6. The composition of claim 5 wherein $R_3$ and $R_4$ are methyl groups.

7. The composition of claim 1 wherein the lactone antioxidant having a 3-phenylbenzofuran-2-one structure is 5,7-di-t-butyl-3-(3,4-dimethylphenyl)-3H-benzofuran-2-one.

8. The composition of claim 2 wherein the lactone antioxidant is 5,7-di-t-butyl-3-(3,4-dimethylphenyl)-3H-benzofuran-2-one.

9. The composition of claim 2 wherein the thermoplastic resin is selected from the group consisting of polyethylene, polypropylene, polyisobutylene, polymethylbutene-1, polymethylpentene-1, polybutene-1, polyisobutylene, ethylene-propylene copolymers having a majority of propylene, propylene-butene-1 copolymers, propylene-isobutylene copolymers, polystyrenes, polyvinylhalides, polyamides, polyesters, polyphenyleneoxides, polyphenylenesulfides, polyacetals, aliphatic polyketone co or terpolymers, poly(ethersulfones), polycarbonates, liquid crystalline polymers, poly(etheretherketones), and poly (arylates).

10. The composition of claim 2 wherein the first stabilizer is a hydrocarbon-substituted diarylamine.

11. The composition of claim 10 wherein the hydrocarbon-substituted diarylamine is 4,4'-bis(α,α-dimethylbenzyl)diphenylamine.

12. The composition of claim 10 wherein the hydrocarbon-substituted diarylamine is 4,4'-bis(α-methylbenzyl)diphenylamine.

13. The composition of claim 10 wherein the hydrocarbon-substituted diarylamine is p-(p-toluenesulfonylamido)-diphenylamine.

14. The composition of claim 2 wherein the first stabilizer is a reaction product of a diarylamine and an aliphatic ketone.

15. The composition of claim 14 wherein the diarylamine is diphenylamine.

16. The composition of claim 14 wherein the ketone is acetone.

17. The composition of claim 2 wherein the first stabilizer is an N,N'-hydrocarbon-substituted para-phenylene diamine.

18. The composition of claim 17 wherein the N,N'-hydrocarbon-substituted paraphenylene diamine is selected from the group consisting of N-phenyl-N'-cyclohexyl-p-phenylenediamine; N-phenyl-N'-sec-butyl-p-phenylenediamine; N-phenyl-N'-isopropyl-p-phenylenediamine; N-phenyl-N'-(1,3-dimethylbutyl)-p-phenylenediamine; N, N'-diphenyl-p-phenylenediamine; N,N'-bis-(1,4-dimethylpentyl)-p-phenylenediamine; N,N'-di-beta naphthyl-p-phenylenediamine; mixed diaryl-p-N,N'-bis-(1-ethyl-3-methylpentyl)-p-phenylenediamines; and N,N'-bis-(1methylheptyl)-p-phenylenediamine.

19. The composition of claim 2 wherein the first stabilizer is a polymerized dihydroquinoline.

20. The composition of claim 19 wherein the polymerized dihydroquinoline is selected from the group consisting of polymerized 1,2-dihydro-2,2,4-trimethylquinoline-6-dodecyl-2,2,4-trimethyl-1,2-dihydroquinoline; and 6-ethoxy-2,2,4-trimethyl-1-2-dihydroquinoline.

21. The composition of claim 2 wherein the sterically hindered phenol has a molecular weight above 500 daltons.

22. The composition of claim 21 wherein the sterically hindered phenol has a molecular weight above 700 daltons.

23. The composition of claim 2 wherein the sterically hindered phenol is selected from the group consisting of:

1,2-bis(3,5-di-t-butyl-4-hydroxyhydrocinnamoyl) hydrazine;
1,3,5-trimethyl-2,4,6-tris(3,5-di-t-butyl-4-hydroxybenzyl) benzene;
1,3,5-tris(3,5-di-t-butyl-4-hydroxybenzyl)-s-triazine-2,4,6 (1H,3H,5H)trione;
1,3,5-tris(4-t-butyl-3-hydroxy-2,6-dimethylbenzyl)-s-triazine-2,4,6-(1H,3H,5H)trione;
2-t-butyl-4,6-dimethyl phenol;
2,2'-methylenebis(4-ethyl-6-t-butyl-phenol);
2,2'-methylenebis(4-methyl-6-t-butyl phenol);
2,4-dimethyl-6-octyl-phenol;
2,4-dimethyl-6-t-butyl phenol;
2,4,6-tri-t-butyl phenol;
2,4,6-triisopropyl phenol;
2,4,6-trimethyl phenol;
2,6-di-t-butyl-4-ethyl phenol;
2,6-di-t-butyl-4-methyl phenol;
2,6-di-t-butyl-4-n-butyl phenol;
2,6-dioctadecyl-4-methyl phenol;
2,6-methyl-4-didodecyl phenol;
3,5-di-t-butyl-4-hydroxyhydrocinnamic acid triester with 1,3,5-tris(2-hydroxyethyl)-5-triazine-2,4,6(1H,3H,5H)-trione; bis(3,3-bis(4-hydroxy-3-t-butylphenyl)butanoic acid)glycolester;
4-hydroxymethyl-2,6-di-t-butyl phenol;
octadecyl 3,5-di-t-butyl-4-hydroxy-hydrocinnamate;
tetrakis{methylene(3,5-di-t-butyl-4-hydroxy-hydrocinnamate)}methane;
2,2'-oxamido-bis{ethyl-3-(3,5-di-t-butyl-4-hydroxy-phenyl)}propionate;
and 1,3,5-trimethyl-2,4,6-tris(3,5-di-t-butyl-4-hydroxybenzyl)benzene.

24. The composition of claim 23 wherein the sterically hindered phenol is tetrakis{methylene(3,5-di-t-butyl-4-hydroxy-hydrocinnamate)}methane.

25. The composition of claim 23 wherein the sterically hindered phenol is octadecyl 3,5-di-t-butyl-4-hydroxy-hydrocinnamate.

26. The composition of claim 23 wherein the sterically hindered phenol is 2,2'-oxamido-bis{ethyl-3-(3,5-di-t-butyl-4-hydroxyphenyl)}propionate.

27. A method for stabilizing a composition comprising a thermoplastic resin comprising adding thereto a stabilizing amount of a blend of at least one sterically hindered phenol antioxidant, at least one aromatic amine antioxidant, and at least one lactone antioxidant having a 3-phenylbenzofuran-2-one structure.

28. A method for stabilizing a composition comprising a thermoplastic resin against oxidative degradation comprising adding to said composition a stabilizing amount of:

(A) a first stabilizer comprising at least one aromatic amine antioxidant selected from the group consisting of:
  (i) a hydrocarbon-substituted diarylamine,
  (ii) a reaction product of a diarylamine and an aliphatic ketone,
  (iii) an N,N'-hydrocarbon substituted para-phenylenediamine, and
  (iv) a polymerized dihydroquinoline;

(B) a second stabilizer comprising at least one sterically hindered phenol antioxidant; and (C) a third stabilizer comprising at least one lactone antioxidant of the structure

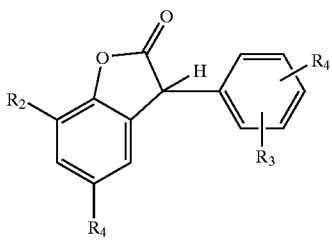

wherein
$R_1$ and $R_2$ are independently selected from the group consisting of hydrogen, chloro, hydroxy, $C_1$–$C_{25}$ alkyl, $C_7$–$C_9$-phenylalkyl, unsubstituted or $C_1$–$C_4$ alkyl-substituted phenyl, unsubstituted or $C_1$–$C_4$ alkyl-substituted $C_5$–$C_8$ cycloalkyl; $C_1$–$C_{18}$ alkoxy, $C_1$–$C_{18}$ alkylthio, $C_1$–$C_4$ alkylamino, di-($C_1$–$C_4$ alkyl)amino, $C_1$–$C_{25}$ alkanoyloxy, $C_1$–$C_{25}$ alkanoylamino, $C_3$–$C_{25}$ alkenoyloxy, $C_3$–$C_{25}$ alkanoyloxy which is interrupted by oxygen, sulfur or >$NR_8$ ; $C_6$–$C_9$ cycloalkylcarbonyloxy, benzoyloxy or $C_1$–$C_{12}$ alkyl-substituted benzoyloxy;
$R_8$ is hydrogen or $C_1$–$C_8$ alkyl; and
$R_3$ and $R_4$ are independently selected from the group consisting of hydrogen, $C_1$–$C_8$ alkyl, $C_1$–$C_4$ alkoxy, halogen, a group

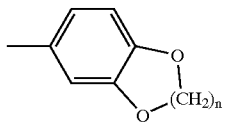

in which n is 1 or 2, or a group

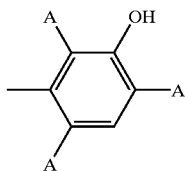

in which the radicals A are independently selected from the group consisting of $C_1$–$C_8$ alkyl and $C_1$–$C_8$ alkoxy.

29. The method of claim 28 wherein $R_1$ and $R_2$ are independently selected alkyl groups of from 1 to 25 carbons atoms.

30. The method of claim 29 wherein $R_1$ and $R_2$ are tert-butyl groups.

31. The method of claim 28 wherein $R_3$ and $R_4$ are independently selected alkyl groups of from 1 to 8 carbons atoms.

32. The method of claim 31 wherein $R_3$ and $R_4$ are methyl groups.

33. The method of claim 27 wherein the lactone antioxidant having a 3-phenylbenzofuran-2-one structure is 5,7-di-t-butyl-3-(3,4-dimethylphenyl)-3H-benzofuran-2-one.

34. The method of claim 28 wherein the lactone antioxidant is 5,7-di-t-butyl-3-(3,4-dimethylphenyl)-3H-benzofuran-2-one.

35. The method of claim 28 wherein the thermoplastic resin is selected from the group consisting of polyethylene, polypropylene, polyisobutylene, polymethylbutene-1, polymethylpentene-1, polybutene-1, polyisobutylene, ethylene-propylene copolymers having a majority of propylene, propylene-butene-1 copolymers, propylene-isobutylene copolymers, polystyrenes, polyvinylhalides, polyamides, polyesters, polyphenyleneoxides, polyphenylenesulfides, polyacetals, aliphatic polyketone co or terpolymers, poly(ethersulfones), polycarbonates, liquid crystalline polymers, poly(etheretherketones), and poly (arylates).

36. The method of claim 28 wherein the first stabilizer is a hydrocarbon-substituted diarylamine.

37. The method of claim 36 wherein the hydrocarbon-substituted diarylamine is 4,4'-bis($\alpha,\alpha$-dimethylbenzyl) diphenylamine.

38. The method of claim 36 wherein the hydrocarbon-substituted diarylamine is 4,4'-bis($\alpha$-methylbenzyl) diphenylamine.

39. The method of claim 36 wherein the hydrocarbon-substituted diarylamine is p-(p-toluenesulfonylamido)-diphenylamine.

40. The method of claim 28 wherein the first stabilizer is a reaction product of a diarylamine and an aliphatic ketone.

41. The method of claim 40 wherein the diarylamine is diphenylamine.

42. The method of claim 40 wherein the ketone is acetone.

43. The method of claim 28 wherein the first stabilizer is an N,N'-hydrocarbon-substituted para-phenylene diamine.

44. The method of claim 43 wherein the N,N'-hydrocarbon-substituted para-phenylene diamine is selected from the group consisting of N-phenyl-N'-cyclohexyl-p-phenylenediamine; N-phenyl-N'-sec-butyl-p-phenylenediamine; N-phenyl-N'-isopropyl-p-phenylenediamine; N-phenyl -N'-(-,3-dimethylbutyl)-p-phenylenediamine; N, N'-diphenyl-p-phenylenediamine; N,N'-bis-(1,4-dimethylpentyl)-p-phenylenediamine; N,N'-di-beta naphthyl-p-phenylenediamine; mixed diaryl-p-N,N'-bis-(1-ethyl-3-methylpentyl)-p-phenylenediamines; and N,N'-bis-(l methylheptyl)-p-phenylenediamine.

45. The method of claim 28 wherein the first stabilizer is a polymerized dihydroquinoline.

46. The method of claim 45 wherein the polymerized dihydroquinoline is selected from the group consisting of polymerized 1,2-dihydro-2,2,4-trimethylquinoline; 6-dodecyl-2,2,4-trimethyl-1,2-dihydroquinoline; and 6-ethoxy-2,2,4-trimethyl-1-2-dihydroquinoline.

47. The method of claim 28 wherein the sterically hindered phenol has a molecular eight above 500 daltons.

48. The method of claim 47 wherein the sterically hindered phenol has a molecular eight above 700 daltons.

49. The method of claim 28 wherein the sterically hindered phenol is selected from the group consisting of:

2-bis(3,5-di-t-butyl-4-hydroxyhydrocinnamoyl)hydrazine;
1,3,5-trimethyl-2,4,6-tris(3,5-di-t-butyl-4-hydroxybenzyl) benzene;
1,3,5-tris(3,5-di-t-butyl-4-hydroxybenzyl)-s-triazine-2,4,6 (1H,3H,5H)trione;
1,3,5-tris(4-t-butyl-3-hydroxy-2,6-dimethylbenzyl)-s-triazine-2,4,6-(1H,3H,5H)trione;
2-t-butyl-4,6-dimethyl phenol;
2,2'-methylenebis(4-ethyl-6-t-butyl-phenol);
2,2'-methylenebis(4-methyl-6-t-butyl phenol);
2,4-dimethyl-6-octyl-phenol;
2,4-dimethyl-6-t-butyl phenol;
2,4,6-tri-t-butyl phenol;
2,4,6-tri-sopropyl phenol;

2,4,6-trimethyl phenol;
2,6-di-t-butyl-4-ethyl phenol;
2,6-di-t-butyl-4-methyl phenol;
2,6-di-t-butyl-4-n-butyl phenol;
2,6-dioctadecyl-4-methyl phenol,
2,6-methyl-4-didodecyl phenol;
3,5-di-t-butyl-4-hydroxyhydrocinnamic acid triester with 1,3,5-tris(2-hydroxyethyl)-5-triazine-2,4,6(1H,3H,5H)-trione; bis(3,3-bis(4-hydroxy-3-t-butylphenyl)butanoic acid)glycolester;
4-hydroxymethyl-2,6-di-t-butyl phenol;
octadecyl 3,5-di-t-butyl-4-hydroxy-hydrocinnamate;
tetrakis{methylene(3,5-di-t-butyl-4-hydroxy-hydrocinnamate)}methane;
2,2'-oxamido-bis{ethyl-3-(3,5-di-t-butyl-4-hydroxyphenyl)}propionate;
and 1,3,5-trimethyl-2,4,6-tris(3,5-di-t-butyl-4-hydroxybenzyl)benzene.

50. The method of claim 49 wherein the sterically hindered phenol is tetrakis{methylene(3,5-di-t-butyl-4-hydroxy-hydrocinnamate)}methane.

51. The method of claim 49 wherein the sterically hindered phenol is octadecyl 3,5-di-t-butyl-4-hydroxy-hydrocinnamate.

52. The method of claim 49 wherein the sterically hindered phenol is 2,2'-oxamido-bis{ethyl-3-(3,5-di-t-butyl-4-hydroxyphenyl)}propionate.

* * * * *